(12) United States Patent
Tarayan

(10) Patent No.: US 11,609,639 B2
(45) Date of Patent: Mar. 21, 2023

(54) METHOD AND DEVICE FOR ACTIVATING A CLEANING MODE OF A TOUCH-OPERABLE BUTTON

(71) Applicant: MERCEDES-BENZ GROUP AG, Stuttgart (DE)

(72) Inventor: Emin Tarayan, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/770,414

(22) PCT Filed: Sep. 7, 2020

(86) PCT No.: PCT/EP2020/074889
§ 371 (c)(1),
(2) Date: Apr. 20, 2022

(87) PCT Pub. No.: WO2021/078434
PCT Pub. Date: Apr. 29, 2021

(65) Prior Publication Data
US 2022/0391020 A1    Dec. 8, 2022

(30) Foreign Application Priority Data
Oct. 21, 2019   (DE) ..................... 10 2019 007 300.2

(51) Int. Cl.
*G06F 3/01* (2006.01)
*B60K 35/00* (2006.01)

(52) U.S. Cl.
CPC .............. *G06F 3/017* (2013.01); *B60K 35/00* (2013.01); *G06F 3/016* (2013.01);
(Continued)

(58) Field of Classification Search
CPC ......... G06F 3/017; G06F 3/016; B60K 35/00; B60K 2370/158; B60K 2370/152;
(Continued)

(56) References Cited

U.S. PATENT DOCUMENTS 9,612,712 B2   4/2017   Huebner et al.
10,773,690 B2   9/2020   Dellock et al.
(Continued)

FOREIGN PATENT DOCUMENTS

DE   102013001332 A1   7/2014
DE   102014005760 A1   10/2015
(Continued)

OTHER PUBLICATIONS

International Search Report dated Nov. 17, 2020 in related/corresponding International Application No. PCT/EP2020/074889.
Office Action dated Feb. 27, 2022 in related/corresponding DE Application No. 10 2019 007 300.2.
(Continued)

*Primary Examiner* — Michael D Lang
(74) *Attorney, Agent, or Firm* — Patent Portfolio Builders PLLC

(57) ABSTRACT

A method for activating a cleaning mode of a touch-operable button of a motor vehicle involves switching the button to at least partially inactive in the cleaning mode to avoid an unintentional actuation. A camera monitors the button and detection of an actuation activating the cleaning mode is carried out by recognizing a cleaning implement guided by a hand of a user on the button.

8 Claims, 2 Drawing Sheets

Figure 1:
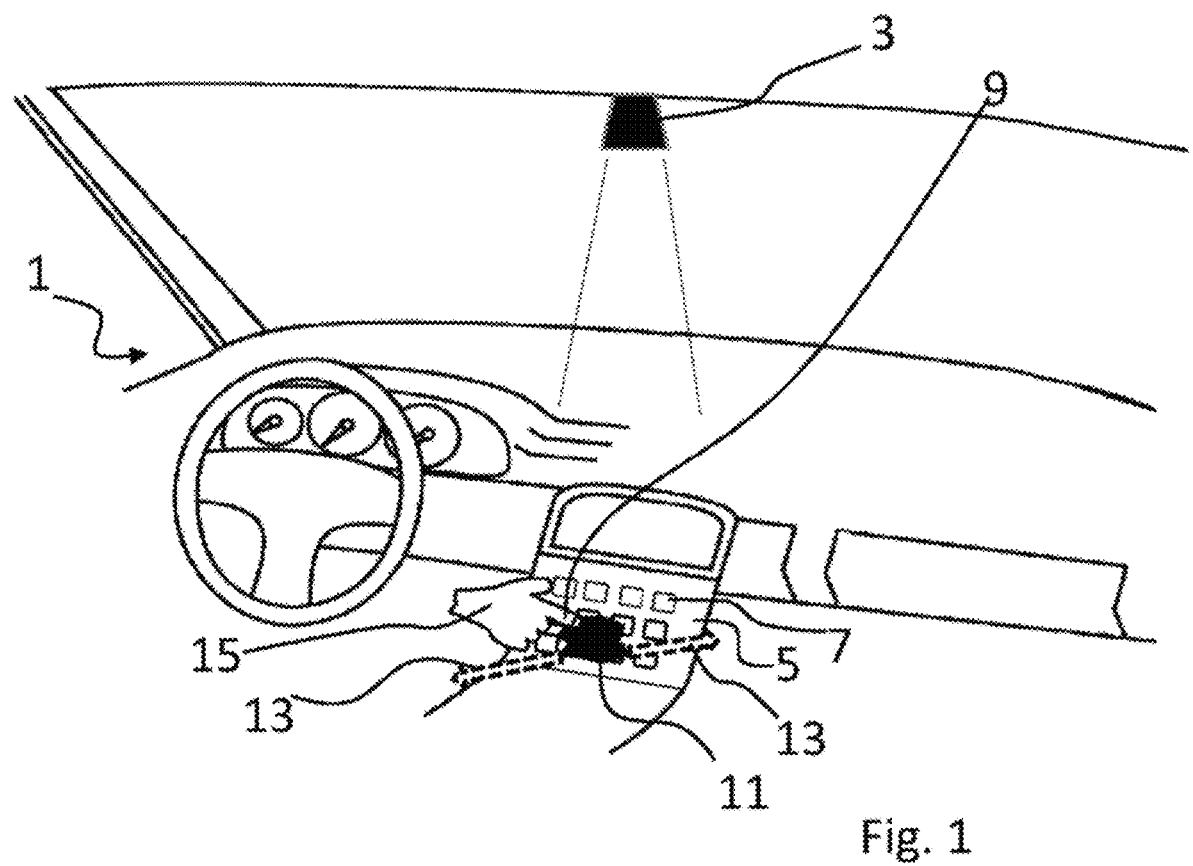

(52) U.S. Cl.
CPC ............... *B60K 2370/1438* (2019.05); *B60K 2370/152* (2019.05); *B60K 2370/158* (2019.05); *B60K 2370/199* (2019.05); *B60K 2370/21* (2019.05)

(58) Field of Classification Search
CPC .......... B60K 2370/199; B60K 2370/21; B60K 2370/1438
See application file for complete search history.

(56) References Cited

U.S. PATENT DOCUMENTS

| | | |
|---|---|---|
| 2012/0206384 A1 | 8/2012 | Marsden et al. |
| 2014/0075703 A1 | 3/2014 | Croteau et al. |
| 2017/0060316 A1 | 3/2017 | Larson |
| 2018/0136833 A1 | 5/2018 | Perkins et al. |

FOREIGN PATENT DOCUMENTS

| | | |
|---|---|---|
| DE | 102015122955 A1 | 7/2016 |
| DE | 102015010722 A1 | 2/2017 |
| DE | 102018115395 A1 | 1/2019 |
| DE | 102018211251 A1 | 1/2020 |
| EP | 1092184 B1 | 9/2002 |
| WO | 2018147255 A1 | 8/2018 |

OTHER PUBLICATIONS

Written Opinion dated Nov. 17, 2020 in related/corresponding International Application No. PCT/EP2020/074889.

METHOD AND DEVICE FOR ACTIVATING A CLEANING MODE OF A TOUCH-OPERABLE BUTTON

BACKGROUND AND SUMMARY OF THE INVENTION

Exemplary embodiments of the invention relate to a method and a device set up to recognize a cleaning process of a button and to activate a cleaning mode.

Operating functions by means of touch-sensitive buttons is increasingly used in modern motor vehicles. The actuation leaves behind unavoidable fingerprints on the surface of the buttons, whereby regular cleaning is required.

US 20180136833 A1 discloses an arrangement with a touchscreen designed to recognize predetermined gestures carried out on the touch screen with a finger or an input means. Upon detecting the predetermined gestures, a cleaning mode is activated in which the touchscreen is switched to inactive to avoid erroneous actuation during a cleaning process.

A disadvantage of the disclosed arrangement is that cleaning with a cleaning means always requires the predetermined gesture to be explicitly input prior to this. Before cleaning can be carried out with a cleaning means such as a cloth, the gesture must be carried out with a finger or a specific operating element.

In contrast, exemplary embodiments of the present invention provide a method and a device that enable a more comfortable activation of the cleaning mode.

According to embodiments of the invention, the button is monitored with a camera, and an actuation activating the cleaning mode is detected upon recognizing a cleaning means guided or held by a hand of a user on the button. Upon recognizing the cleaning means guided by the hand of the user on the button, the cleaning mode is activated. The camera records that a hand of a user places a cleaning means, i.e., for example a cleaning cloth, a sponge, a fleece or similar, on the surface of the button. As a result of recognizing the cleaning means on the surface of the button, the cleaning mode is activated in order to avoid an erroneous actuation of the buttons due to a damp cleaning means on a capacitive or inductive display or a finger slipping off the cloth. Correspondingly, with a pressure-sensitive display, such as a resistive display, for example, an erroneous actuation is avoided. The one or more cameras are arranged in the roof liner for recording objects and gestures of the occupants. For example, a camera is arranged in the roof liner in the region between the driver and passenger seats, such that driver and passenger gestures can be recorded, in particular via displays. The camera comprising a corresponding control device is set up to recognize learnt gestures and objects. To do so, a neural network comprised by the control device, for example, is trained until a recognition of the gestures and objects is guaranteed with a sufficiently high degree of probability. The button comprises actuation fields such as icons with a function being allocated to them in each case. When activating the cleaning mode, the actuation fields are switched to be at least partially inactive, i.e., a function allocated to the button is not carried out either by touch or pressure on the actuation fields. The button is designed, for example, as a touchpad, as a touch display, or as a touch-operable operating field. The button functions, for example, according to a capacitive, inductive, or resistive method. Advantageously, the method according to the invention enables a cleaning of the button surface without have to explicitly switch on a cleaning mode. Upon recognizing the cleaning means, the cleaning mode can be activated in good time, i.e., before it is erroneously triggered by a wiping movement. In particular when cleaning with an optionally partially damp cleaning means, activation gestures known from the prior art cannot be carried out on a touch display. In contrast, a user would have to initially carry out the activation gesture with their finger in order to then be able to carry out the cleaning with the cleaning means.

In a design of the method, the button is monitored with a camera, and the cleaning mode is activated if movement of the hand of the user that is characteristic of cleaning is recognized. The characteristic movements are, for example, wiping or circular movements intrinsic to a cleaning process.

As a result of recognizing the characteristic movement in addition to recognizing the cleaning means by means of the camera, the recognition probability of a cleaning process is advantageously clearly increased. The higher the recognition probability, the lower an erroneous activation of the cleaning mode.

In an alternative or additional embodiment, the cleaning mode is activated due to a characteristic movement, recognized by means of the touch-operable button, of the cleaning means guided by the hand of the user. The path covered by the movement of the cleaning means is ascertained by the touch sensors of the button. When the path matches or is similar to a predetermined characteristic path of a wiping process, a cleaning process can be assumed and the cleaning mode activated. By recognizing a characteristic movement by means of touch sensors, the recognition probability of a cleaning process can be further increased in addition to recognition by the camera.

In a further design of the method, the activation of the cleaning mode is confirmed with a piece of haptic, optical, and/or acoustic feedback. The haptic feedback is, for example, a vibration of the button caused by an actuator. The optical feedback is carried out on a touch display, for example by displaying an image depicting a wiping process, by displaying the operating state "cleaning mode"; alternatively, the screen can also be switched to dark.

In a further preferred embodiment, the cleaning mode is only activated in a predetermined driving speed range. If a driver begins to clean the screen above a predetermined speed range, the cleaning mode is not placed into the cleaning mode in order to avoid distracting the driver. In the event of a cleaning intention detected by the cleaning means or the characteristic movement, a warning signal is emitted to the driver. The warning signal comprises a piece of information that the cleaning mode is not available and/or a request to turn their attention back to the traffic. Advantageously, the method avoids endangering traffic as a result of distraction.

In a modified embodiment, different driving speed ranges for activating a cleaning mode are predetermined for drivers and passengers. Here, the camera detects who is holding the cleaning means or who is guiding the cleaning means on the surface of the button or who is carrying out the characteristic movement. In an embodiment, the cleaning mode is activated upon actuation by the passenger in the entire speed range of the vehicle while only up to a predetermined speed threshold upon actuation by the driver. To provide maximum availability, the method makes it possible to distinguish between various operating persons.

In a modified embodiment, the cleaning mode is ended as soon as the camera does not recognize any cleaning means and/or an actuation with a finger is not recognized for a predetermined period of time. The method according to the invention provides an automatic ending of the cleaning mode.

The device according to the invention comprises a camera, which records an actuation activating the cleaning mode, wherein the activating actuation includes a cleaning means guided by a hand of a user on the display surface. To prevent erroneous actuation, the device according to the invention enables the button to be switched automatically into a cleaning mode.

Further advantages, features and details emerge from the description below, in which—optionally with reference to the drawings—at least one exemplary embodiment is described in detail. Features described or depicted pictorially can form the subject matter of the invention individually or in any meaningful combination, optionally also independently of the claims, and can also additionally be the subject matter or one or more separate application(s). The same, similar and/or functionally identical parts are provided with the same reference numerals.

BRIEF DESCRIPTION OF THE DRAWING FIGURES

Here are shown:
FIG. 1 interior chamber of a vehicle with a camera and
FIG. 2 flowchart of the method according to the invention.

DETAILED DESCRIPTION

FIG. 1 shows an interior chamber 1 of a vehicle, which is monitored by a camera 3. A button designed as a touch display 5 having several actuating fields 7, of which only one is labelled with a reference numeral for the sake of clarity, is arranged in the central console.

Vehicle functions that can be invoked by touch with a finger of a user are allocated to the actuating fields 7. The vehicle functions relate, for example, to a volume control, an entertainment system, an activation of a navigation system, a trunk or door opener, an emergency phone, etc.

Fingerprints are left behind on the display when touching with the finger. The fingerprints or other dirt are to be cleaned by the user with a cleaning means 11, such as a preferably damp cloth.

A characteristic movement 13, indicated by arrows, of the cleaning means 11 guided by a hand or a finger of the user would cause the actuation fields 7 to be touched in an uncoordinated manner and activate functions when not wanted. In order to avoid this kind of erroneous actuation, the touch display 5 is monitored by means of the camera 3.

The camera is trained to recognize the characteristic movements of the hand 15 and/or, moreover, the cleaning means 11 itself. Training the camera, i.e., the camera and corresponding evaluating unit, is carried out according to methods known from the prior art, for example by means of a neural network. As soon as a characteristic movement 11 and/or a cleaning means 11 is recognized, the touch display 5 is switched into a cleaning mode. The cleaning mode causes the actuating fields 7 to be switched to passive and to prevent a touch with the cleaning means 11 or with a finger of the hand 15 guided along with the cleaning means 11.

In a further variant, the recognition probability of a cleaning process is increased by the movement of the cleaning means 11 additionally being controlled by means of the sensor system of the touch display 5. A movement characteristic of a cleaning process can be inferred from the path caused by the movement of the cleaning means 11 and ascertained by the sensors of the touch display. The movements recognized by the touch display 5 can be made plausible with the movements and objects recognized by the camera 3.

Figure 2:
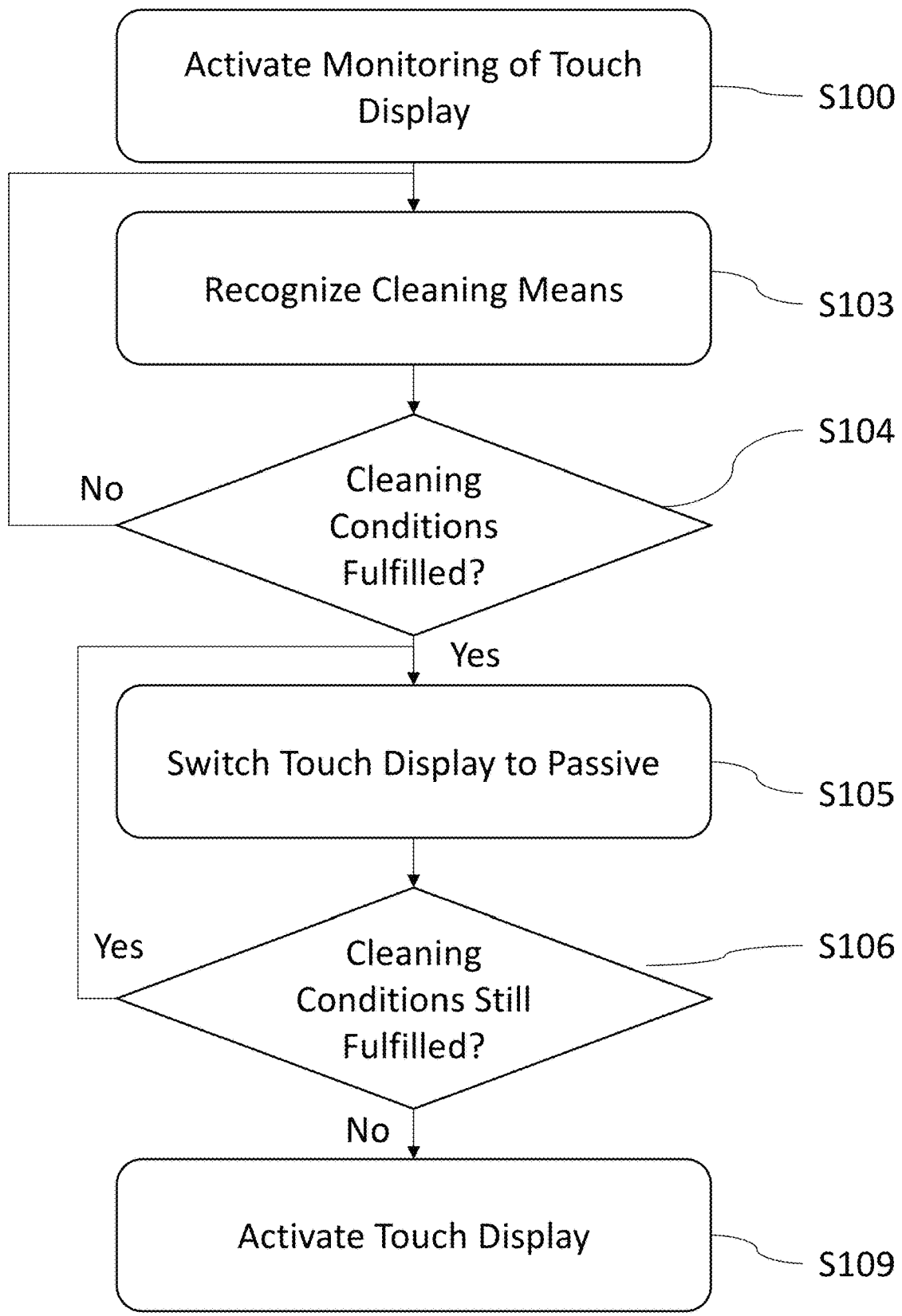

In FIG. 2, a flowchart of a variant of a method that can be carried out with the device shown in FIG. 1 is depicted. In step S100, a monitoring of the touch display 5 by the camera 3 is activated, for example when the vehicle starts. In step S103, the camera 3 recognizes a cleaning means 11 guided, i.e., issued, by a user's hand on the touch display 5 and/or a cleaning means 11 guided in a characteristic movement 13. In step S104, it is checked as to whether the conditions for a cleaning mode are fulfilled, i.e., if the vehicle is driving in a predetermined speed range and/or if the driver or passenger, for example, is authorized to clean in the current speed range. If the conditions are not fulfilled, it returns to step S103. At the same time, a signal is emitted to the user that, in the current driving state, a cleaning of the screen is not enabled. If the conditions are fulfilled, the touch display 5 is switched to passive, i.e., into the cleaning mode, in step S105. The switch into the cleaning mode is displayed visually to the user on the touch display 5. In step S107, it is checked as to whether the conditions for the cleaning mode are still fulfilled. If the conditions for the cleaning mode are still fulfilled, it returns to step S105; if the conditions are no longer fulfilled, the touch display 5 is activated again in step S109 for an intended actuation. The conditions for a cleaning mode are no longer fulfilled when, for a predetermined period of time, no cleaning means or no cleaning means guided in the movement characteristic of a cleaning process is recognized or when the camera 3 recognizes an actuation of the touch display 5 with just a finger 9 of the user's hand 15, i.e., without cleaning means 11.

Although the invention has been illustrated and explained in more detail by preferred exemplary embodiments, the invention is thus not limited by the disclosed example, and other variations can be derived from this by the person skilled in the art, without leaving the protected scope of the invention. It is thus clear that a plurality of possible variations exist. It is also clear that embodiments mentioned by way of example really only constitute examples which are not to be construed in any way as limiting the protection range, for example, the application possibilities or the configuration of the invention. Instead, the description above and the description of the figures put the person skilled in the art in a position to concretely implement the exemplary embodiments, wherein, with an understanding of the inventive thought disclosed, the person skilled in the art can carry out various amendments, for example in terms of the function or the arrangement of individual elements mentioned in an exemplary embodiment, without leaving the protected scope of the invention, which is defined by the claims and their legal correspondences, such as extensive explanations in the description, for example.

The invention claimed is:
1. A method for activating a cleaning mode of a touch-operable button of a motor vehicle, the method comprising:
monitoring, by a camera of the motor vehicle, the touch-operable button;
detecting, by the camera, an actuation to activate the cleaning mode, wherein the actuation to activate the cleaning mode comprises a cleaning means guided by a hand of a user on the touch-operable button; and
switching the touch-operable button to be at least partially inactive based on the detected actuation to activate the cleaning mode, wherein the touch-operable button is a touchpad, a touch display, or a touch-operable operating field.

2. The method of claim 1, wherein the actuation to activate the cleaning mode further comprises detecting a characteristic movement of the hand of the user.

3. The method of claim 2, wherein the characteristic movement of the hand of the user is detected by sensors of the touch-operable button.

4. The method of claim 1, further comprising:
outputting a haptic or optical feedback to confirm the activation of the cleaning mode.

5. The method of claim 1, further comprising:
detecting a speed of the motor vehicle, wherein the cleaning mode is only activated when the detected speed is in a predetermined speed range.

6. The method of claim 5, wherein the predetermined speed range includes a first predetermined speed range for actuations by a driver of the motor vehicle and a second predetermined speed range for actuations by a passenger of the motor vehicle.

7. The method of claim 1, further comprising:
determining that the cleaning means has not been detected by the camera for a predetermined amount of time or an actuation on the touch-operable button with a finger of the user's hand is detected by the camera, and ending the cleaning mode responsive to the cleaning means not being detected for the predetermined amount of time or responsive to the actuation on the touch-operable button with the finger of the user's hand.

8. A device of a motor vehicle configured to recognize an actuation activating a cleaning mode of a button of the motor vehicle, the device comprising:
a camera arranged to record the activating actuation, wherein the activating actuation includes a cleaning means guided by a hand of a user on the button, wherein the button is a touchpad, a touch display, or a touch-operable operating field.

\* \* \* \* \*